United States Patent
Ohno

(10) Patent No.: US 11,007,914 B2
(45) Date of Patent: May 18, 2021

(54) VEHICLE OCCUPANT PROTECTION DEVICE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 15/900,216

(22) Filed: Feb. 20, 2018

(65) Prior Publication Data

US 2018/0236907 A1 Aug. 23, 2018

(30) Foreign Application Priority Data

Feb. 23, 2017 (JP) .............................. JP2017-032037

(51) Int. Cl.
*B60N 2/427* (2006.01)
*B60N 2/42* (2006.01)
*B60N 2/02* (2006.01)
*B60N 2/66* (2006.01)
*B60N 2/888* (2018.01)

(52) U.S. Cl.
CPC ......... *B60N 2/4279* (2013.01); *B60N 2/0276* (2013.01); *B60N 2/4228* (2013.01); *B60N 2/42745* (2013.01); *B60N 2/6673* (2015.04); *B60N 2/888* (2018.02)

(58) Field of Classification Search
CPC ................ B60N 2/4279; B60N 2/0276; B60N 2/42745; B60N 2/6673; B60N 2/888; B60N 2/4228; B60N 2/427; B60N 2/66
USPC .......................................................... 701/45
See application file for complete search history.

(56) References Cited

U.S. PATENT DOCUMENTS

| | | | |
|---|---|---|---|
| 2007/0024096 A1* | 2/2007 | Sakai | B60N 2/888 297/216.12 |
| 2016/0325641 A1 | 11/2016 | Ohno et al. | |

FOREIGN PATENT DOCUMENTS

| | | | |
|---|---|---|---|
| DE | 60 2004 001 059 T2 | 11/2006 | |
| DE | 10 2008 040 038 A1 | 6/2009 | |
| DE | 10 2012 025 269 A1 | 8/2013 | |
| EP | 1 445 155 A1 | 8/2004 | |
| JP | 2001-114069 A | 4/2001 | |
| JP | 2005-335616 A | 12/2005 | |
| JP | 2005335616 A * | 12/2005 | |
| JP | 2007-331652 | 12/2007 | |
| JP | 2009-151522 * | 7/2009 | |
| JP | 4439622 B2 * | 3/2010 | ........... D07B 1/0646 |
| JP | 4439633 B2 | 3/2010 | |
| JP | 2010-208542 | 9/2010 | |
| JP | 2010208542 * | 9/2010 | |

(Continued)

*Primary Examiner* — Maceeh Anwari
(74) *Attorney, Agent, or Firm* — Oblon, McClelland, Maier & Neustadt, L.L.P.

(57) ABSTRACT

A vehicle occupant protection device, that includes: a vehicle occupant protection control unit that, in a case in which a rear impact of the vehicle is predicted, effects control such that a seat of the vehicle approaches a rear impact protection attitude that protects a vehicle occupant from a rear impact, and that, in a case in which the vehicle is forcibly stopped, effects control such that a driver seat of the vehicle approaches closer to the rear impact protection attitude than in the case in which a rear impact of the vehicle is predicted.

9 Claims, 9 Drawing Sheets

(56) References Cited

FOREIGN PATENT DOCUMENTS

| | | | |
|---|---|---|---|
| JP | 2016-210405 A | 12/2016 | |
| JP | 2016-215938 A | 12/2016 | |

\* cited by examiner

VEHICLE OCCUPANT PROTECTION DEVICE

CROSS-REFERENCE TO RELATED APPLICATION

This application is based on and claims priority under 35 USC 119 from Japanese Patent Application No. 2017-032037 filed on Feb. 23, 1017, which is incorporated by reference herein.

BACKGROUND

Technical Field

The present disclosure relates to a vehicle occupant protection device.

Related Art

Japanese Patent Application Laid-Open (JP-A) No. 2009-151522 discloses an emergency pull over system that causes a vehicle to pull over to the roadside if a driver's awareness level declines. When the driver's awareness level declines below a predetermined value and the present vehicle is changing lane, if the lane being changed to is a passing lane, the technology makes a determination as to whether another vehicle is detected to the rear of the present vehicle. If no vehicle to the rear is detected, the present vehicle remains in its original running lane; if a vehicle to the rear is detected, the present vehicle executes the lane change to the passing lane.

When a collision is predicted, a technology recited in JP-A No. 2010-208542 puts a vehicle occupant into a suitable posture by adjusting a tilt angle of a seatback into a suitable range. Then, when the collision is detected, the seatback is tilted to an angle that differs in accordance with a collision mode of the detected collision (a front collision, a side collision or a rear collision). Thus, ease of aid and evacuation of the vehicle occupant is improved in response to the collision mode.

When a rear collision (a rear impact) occurs, injury and the like caused by an impact applied to an occupant of the vehicle may be moderated by, before the rear impact occurs, the seatback and headrest or the like of a seat on which the vehicle occupant is sitting being moved to an attitude that protects the vehicle occupant from the rear impact. However, a driving posture of a vehicle occupant sitting on a driver seat may be any of various postures. Thus, an attitude of the seat that protects the vehicle occupant from a rear impact may differ greatly from an attitude of the driver seat that has been adjusted to suit the driving posture of the vehicle occupant sitting on the driver seat. Therefore, moving the driver seat of the vehicle to an attitude that protects the vehicle occupant from a rear impact before the rear impact occurs may cause a hindrance to driving operations by the vehicle occupant sitting on the driver seat.

The technology recited in JP-A No. 2009-151522 reduces the possibility of a collision with a vehicle to the rear when a driver's awareness level has declined and the vehicle is changing lane to a passing lane, by executing the lane change to the passing lane if another vehicle is detected to the rear of the vehicle. However, a lane change to a passing lane is a movement in a direction away from the roadside, which is the objective of pulling over, and may cause other problems such as the vehicle running for a long time in the state in which the driver's awareness level has declined.

The technology recited in JP-A No. 2010-208542 improves ease of aid and evacuation of a vehicle occupant by tilting a seatback to an angle according to a collision mode after the collision is detected. This technology is not limited to putting the seat into an attitude that protects the vehicle occupant from a rear impact at a time after the rear impact has occurred. Therefore, the technology recited in JP-A No. 2010-208542 does not necessarily contribute to an improvement in safety of the vehicle occupant when a rear impact occurs.

SUMMARY OF INVENTION

An object of the present disclosure is to improve safety of a vehicle occupant when a rear impact occurs, while suppressing hindrance to driving operations being performed by a vehicle occupant sitting on a driver seat.

An aspect is a vehicle occupant protection device, that includes: a vehicle occupant protection control unit that, in a case in which a rear impact of the vehicle is predicted, effects control such that a seat of the vehicle approaches a rear impact protection attitude that protects a vehicle occupant from a rear impact, and that, in a case in which the vehicle is forcibly stopped, effects control such that a driver seat of the vehicle approaches closer to the rear impact protection attitude than in the case in which a rear impact of the vehicle is predicted.

DESCRIPTION OF EMBODIMENTS

Figure 1:
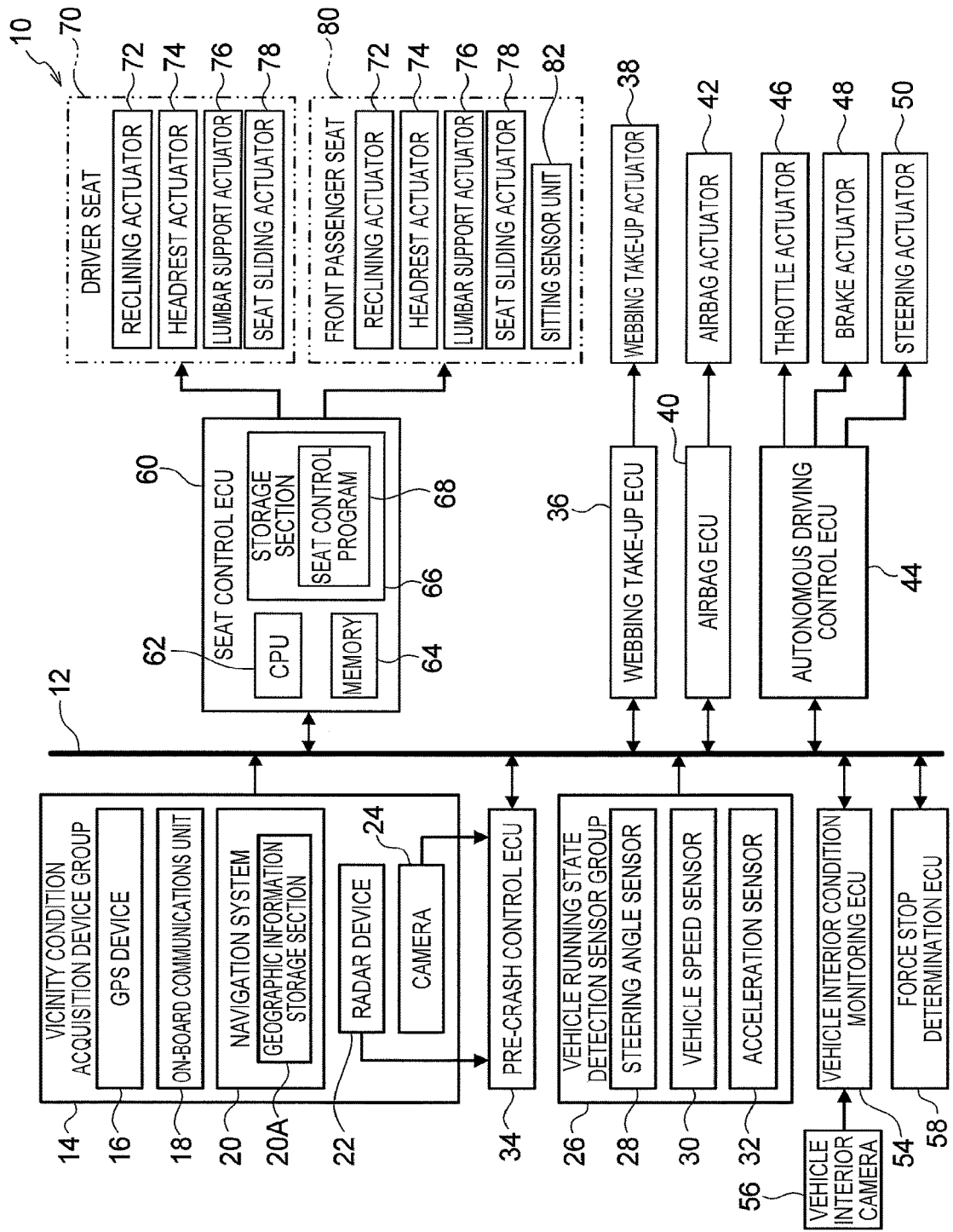
FIG. 1 is a schematic block diagram of an on-board system according to an exemplary embodiment.

Herebelow, examples of exemplary embodiments of the present disclosure are described in detail with reference to the attached drawings. An on-board system 10 illustrated in FIG. 1 is provided with a bus 12. The bus 12 is connected to each of a vicinity condition acquisition device group 14, a vehicle running state detection sensor group 26, and plural electronic control units that perform mutually different kinds of control. Each electronic control unit is a control unit including a CPU, a memory and a nonvolatile storage section, and is below referred to as "the ECU". FIG. 1 shows only a portion of the on-board system 10. A vehicle in which the on-board system 10 is mounted is below referred to as "the present vehicle".

The vicinity condition acquisition device group 14 includes, as devices that acquire information representing conditions of the environment in the vicinity of the present vehicle, a global positioning system (GPS) device 16, an on-board communications unit 18, a navigation system 20, a radar device 22 and cameras 24.

The GPS device 16 receives GPS signals from plural GPS satellites and locates the position of the present vehicle. The greater the number of GPS signals the GPS device 16 can receive, the better the accuracy of locating. The on-board communications unit 18 is communications equipment that performs at least one of vehicle-to-vehicle communications with other vehicles and vehicle-to-infrastructure communications with road side equipment. The navigation system 20 includes a geographic information storage section 20A that stores geographic information. Processing that displays the position of the present vehicle on a map and gives guidance on a route to a destination is conducted on the basis of position information obtained from the GPS device 16 and the geographic information stored in the geographic information storage section 20A.

The radar device 22 includes a plural number of laser devices with mutually different detection ranges. The radar device 22 detects objects such as pedestrians, other vehicles and the like located in the vicinity of the present vehicle, including to the front and rear of the present vehicle, as point information. The radar device 22 acquires relative positions and relative speeds between the detected objects and the present vehicle. The radar device 22 incorporates processing equipment that processes detection results of objects in the vicinity. On the basis of changes in the relative positions and relative speeds of the individual objects included in the detection results over plural sets of the most recent detection results, and the like, the processing equipment removes noise and excludes road side objects such as guard rails and the like from monitoring targets, and tracks monitoring target objects, which are specified objects such as pedestrians, other vehicles and the like. The radar device 22 outputs information on the relative positions and relative speeds of the individual monitoring target objects.

The cameras 24 image the vicinity of the present vehicle, including to the front and rear of the present vehicle, with a number of cameras and output the captured images.

The vehicle running state detection sensor group 26 is a number of sensors that acquire running states of the vehicle, including a steering angle sensor 28 that detects steering angles of the present vehicle, a vehicle speed sensor 30 that detects running speeds of the present vehicle, and an acceleration sensor 32 that detects accelerations applied to the vehicle.

The plural ECUs connected to the bus 12 include a pre-crash control ECU 34, a webbing take-up ECU 36, an airbag ECU 40, an autonomous driving control ECU 44, a vehicle interior condition monitoring ECU 54, a force stop determination ECU 58 and a seat control ECU 60.

The pre-crash control ECU 34 is connected to the radar device 22 and the cameras 24. The pre-crash control ECU 34 detects positions of the individual monitoring target objects in images inputted from the cameras 24, in accordance with information inputted from the radar device 22 (for example, relative positions and the like of the individual monitoring target objects). The pre-crash control ECU 34 extracts characteristic quantities of the individual monitoring target objects located within a predetermined range and, on the basis of the extracted characteristic quantities, determines types of the monitoring target objects located in the predetermined range (pedestrian, vehicle or the like). By repeating the processing described above, the pre-crash control ECU 34 tracks the monitoring target objects located in the predetermined range and calculates a probability of collision with the vehicle for each monitoring target object.

When the pre-crash control ECU 34 detects a monitoring target object whose probability of collision with the vehicle is above a predetermined value (i.e., when the pre-crash control ECU 34 predicts a collision between the vehicle and a monitoring target object), the pre-crash control ECU 34 sends a collision prediction signal to specific ECUs in the on-board system 10, including the seat control ECU 60. Information representing a collision mode (a front collision, a side collision or a rear impact) between the present vehicle and the collision prediction object is included in the collision prediction signal sent by the pre-crash control ECU 34.

Thus, the radar device 22, cameras 24 and pre-crash control ECU 34 of the present exemplary embodiment are an example of a collision prediction unit of the present disclosure. Collision prediction is not restricted to the use of information inputted from both of the radar device 22 and the cameras 24. For example, a collision may be predicted on the basis of information inputted from one of the radar device 22 and the cameras 24.

A webbing take-up actuator 38 structured by a pretensioner that applies tension to a webbing (a seatbelt) provided at each of respective webbing take-up devices is connected to the webbing take-up ECU 36. When the webbing take-up ECU 36 receives a prediction collision signal from the pre-crash control ECU 34, the webbing take-up ECU 36 operates the pretensioner serving as the webbing take-up actuator 38, taking up slack in each webbing that is wrapped round an occupant of the vehicle.

An airbag actuator 42 is connected to the airbag ECU 40. Together with the airbag ECU 40, the airbag actuator 42 constitutes an airbag device. When an acceleration detected by the acceleration sensor 32 exceeds a threshold, the airbag ECU 40 expands an airbag with the airbag actuator 42 (an inflator). When the airbag ECU 40 receives a collision prediction signal from the pre-crash control ECU 34, the airbag ECU 40 alters the setting of the above-mentioned acceleration threshold.

A throttle actuator 46 and a brake actuator 48 are connected to the autonomous driving control ECU 44. The throttle actuator 46 alters a throttle position of the present vehicle. The brake actuator 48 alters a braking force generated by braking equipment of the present vehicle. The autonomous driving control ECU 44 is also connected to a steering actuator 50. The steering actuator 50 changes a steering amount of steering equipment of the present vehicle. When an autonomous driving mode is selected, the autonomous driving control ECU 44 executes autonomous driving control processing to cause the vehicle to run autonomously without regard to driving operations performed by a vehicle occupant sitting on a driver seat. This autonomous driving control processing determines conditions of the present vehicle and the vicinity on the basis of information acquired by the vicinity condition acquisition device group 14 and the vehicle running state detection sensor group 26, and implements autonomous driving by controlling the throttle actuator 46, the brake actuator 48 and the steering actuator 50. The autonomous driving control processing may be realized using widely known technologies; detailed descriptions are not given here.

The vehicle interior condition monitoring ECU 54 is connected to a vehicle interior camera 56. On the basis of images of a vehicle cabin interior captured by the vehicle interior camera 56, the vehicle interior condition monitoring ECU 54 monitors conditions of vehicle occupants of the present vehicle, including a vehicle occupant sitting on the driver seat. Conditions of the vehicle occupants may include, for example, awareness levels, drowsiness, distracted driving, arousal or calm, and so forth. By image recognition, the vehicle interior condition monitoring ECU 54 detects bio-information including at least one of the eyeline of a vehicle occupant, the orientation of their face, eye movements, and movement of the face. On the basis of the detected bio-information, the vehicle interior condition monitoring ECU 54 detects conditions of the vehicle occupants (particularly the vehicle occupant sitting on the driver seat). Beside the vehicle interior camera 56, conditions of the vehicle occupants may be detected using a directional microphone that acquires sounds inside the vehicle, a biosensor provided in a steering wheel, a brain activity sensor, and so forth.

By communicating with the autonomous driving control ECU 44, the vehicle interior condition monitoring ECU 54 and the like during running of the present vehicle, the force stop determination ECU 58 repeatedly determines whether or not conditions for force-stopping the present vehicle are satisfied. When the force stop determination ECU 58 determines that the conditions for force-stopping the present vehicle are satisfied, the force stop determination ECU 58 sends a force stop signal commanding a force stop of the present vehicle to the autonomous driving control ECU 44 and the seat control ECU 60. When the autonomous driving control ECU 44 receives the force stop signal from the force stop determination ECU 58, the autonomous driving control ECU 44 executes force stop processing to decelerate the present vehicle and stop the present vehicle at the roadside of a road on which the vehicle is running. Thus, the force stop determination ECU 58 and the autonomous driving control ECU 44 are an example of a forcible stop control unit of the present disclosure.

Conditions for force-stopping the present vehicle may include, for example, a case in which a vehicle occupant sitting on the driver seat does not respond to a request to perform driving operations when the autonomous driving control ECU 44 is terminating the autonomous driving control processing. Further examples may include a case in which, in a state in which a vehicle occupant sitting on the driver seat is performing driving operations, the vehicle interior condition monitoring ECU 54 detects an abnormality such as a decline in the awareness level or the like of the vehicle occupant sitting on the driver seat, a case in which a fault diagnosis ECU detects a fault of the present vehicle, and so forth.

The seat control ECU 60 is provided with a CPU 62, a memory 64, and a nonvolatile storage section 66 that stores a seat control program 68. The seat control ECU 60 reads the seat control program 68 from the storage section 66 and loads the seat control program 68 into the memory 64. The seat control program 68 loaded into the memory 64 is executed by the CPU 62. Thus, seat control processing which is described below is carried out. The seat control processing is an example of vehicle occupant protection processing. The seat control program may be recorded on a non-transient storage medium such as a DVD or the like and loaded into the storage section 66.

A reclining actuator 72, a headrest actuator 74, a lumbar support actuator 76 and a seat sliding actuator 78 are respectively provided at each of a driver seat main body 70 (below referred to simply as "the driver seat 70") and a front passenger seat main body 80 (below referred to simply as "the front passenger seat 80") of the vehicle. The seat control ECU 60 is connected to each of the actuators 72, 74, 76 and 78 respectively provided at the driver seat 70 and the front passenger seat 80, and the seat control ECU 60 controls operations of these actuators 72, 74, 76 and 78.

The reclining actuator 72, the headrest actuator 74, the lumbar support actuator 76 and the seat sliding actuator 78 have the same configurations in the driver seat 70 and the front passenger seat 80. A difference between the driver seat 70 and the front passenger seat 80 is that a sitting sensor unit 82 is provided in the front passenger seat 80. The seat control ECU 60 is connected to the sitting sensor unit 82. Below, configurations of the actuators are described in succession, taking the driver seat 70 as an example.

Figure 2:
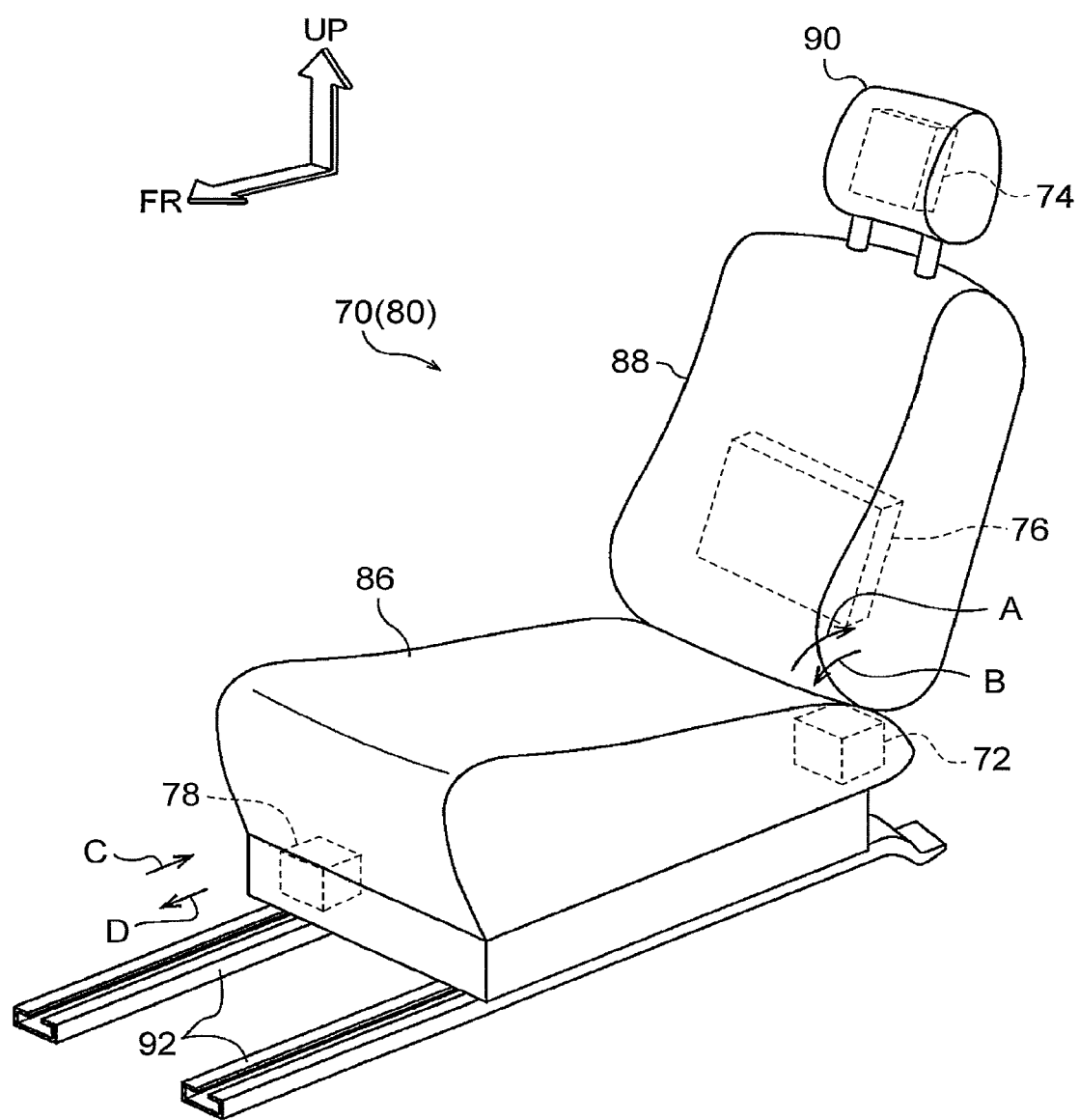
FIG. 2 is a perspective view showing an example of a driver seat (or a front passenger seat).

As shown in FIG. 2, the driver seat 70 includes a seat cushion portion 86, a seatback portion 88 and a headrest portion 90. The headrest portion 90 is attached to a vehicle vertical direction upper end portion of the seatback portion 88 to be movable by sliding in a length direction of the seatback portion 88. A vehicle vertical direction lower end portion of the seatback portion 88 is attached to a vehicle front-and-rear direction rear end portion of the seat cushion portion 86 via a turning mechanism. Thus, the seatback portion 88 is made turnable relative to the seat cushion portion 86 about an axis in the vehicle width direction (the direction of arrow A and the direction of arrow B in FIG. 2).

The reclining actuator 72 is incorporated in the seat cushion portion 86. A rotary shaft of an internal motor of the reclining actuator 72 is linked to the above-mentioned turning mechanism via a reduction gear mechanism. Therefore, the seatback portion 88 can be turned relative to the seat cushion portion 86 in the direction of arrow A and the direction of arrow B in FIG. 2, by driving force from the reclining actuator 72. Thus, the seat control ECU 60 is capable of changing an angle of the seatback portion 88 by starting and stopping driving of the internal motor of the reclining actuator 72, and by controlling the rotation direction and rotation speed of the rotary shaft during the driving.

The reclining actuator 72 also senses the angle of the seatback portion 88 and reports the sensed angle of the seatback portion 88 to the seat control ECU 60. Angle sensing of the seatback portion 88 may be implemented by, for example, acquiring signals from a sensor that senses the angle of the seatback portion 88 or rotation amounts of the rotary shaft of the internal motor of the reclining actuator 72. Further, if the internal motor of the reclining actuator 72 is a pulse motor, the sensing may be implemented by counting numbers of pulses in pulse signals supplied to the internal motor of the reclining actuator 72. When the seat control ECU 60 is changing the angle of the seatback portion 88, the seat control ECU 60 controls the driving of the internal motor of the reclining actuator 72 such that the angle of the seatback portion 88 reported by the reclining actuator 72 matches a target angle.

Figure 3:
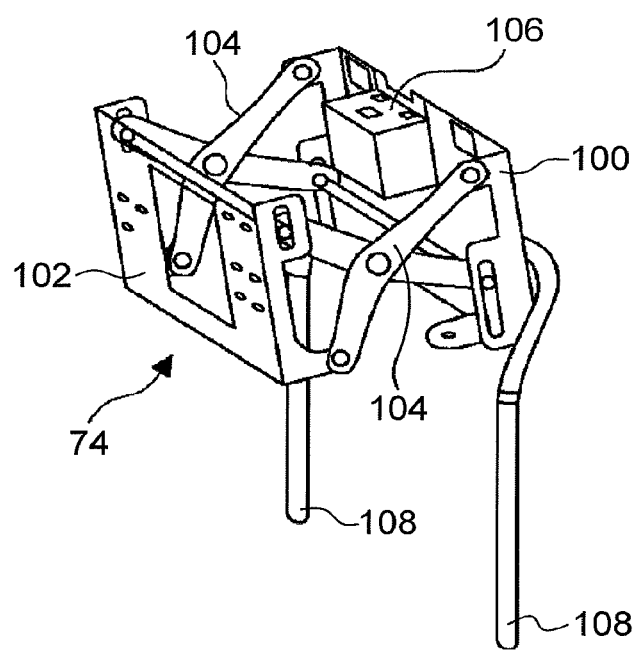
FIG. 3 is a perspective view showing an example of a headrest actuator.

The headrest actuator 74 is incorporated in the headrest portion 90. For example, as shown in FIG. 3, the headrest actuator 74 includes baseplates 100 and 102, which are disposed to be spaced apart in the vehicle front-and-rear direction, and X-arms 104, which link the baseplates 100 and 102 at respective end portions in the vehicle width direction of the baseplates 100 and 102. A rotary shaft of an internal motor 106 of the headrest actuator 74 is linked to the X-arms 104 via a reduction gear mechanism, and the headrest actuator 74 is capable of changing the spacing between the baseplates 100 and 102 with driving force of the internal motor 106.

Figure 4:
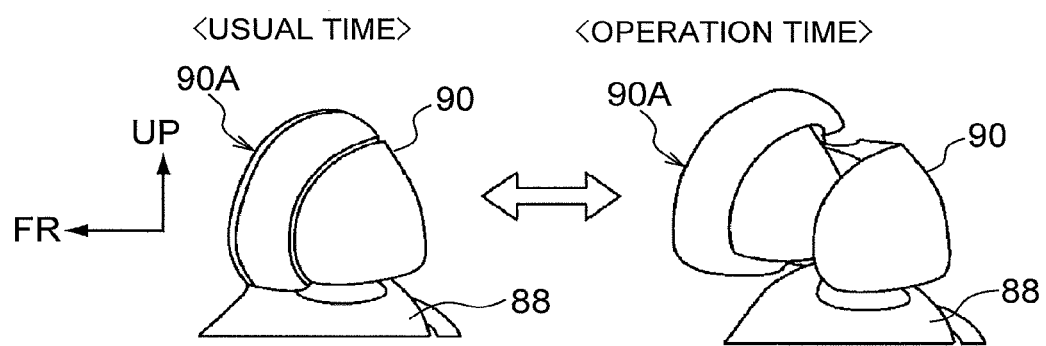
FIG. 4 is side views of a headrest portion at a usual time and an operation time of the headrest actuator.

When the spacing of the baseplates 100 and 102 is maintained at a predetermined value, a length of the headrest portion 90 in the vehicle front-and-rear direction is set to a usual length, depicted as a usual time in FIG. 4. On the other hand, when the spacing between the pair of baseplates 100 and 102 is increased by driving force of the internal motor 106 of the headrest actuator 74, the length of the headrest portion 90 in the vehicle front-and-rear direction is increased, depicted as an operation time in FIG. 4.

Rods (headrest stays) 108 are attached to the baseplate 100, which is the baseplate that is disposed at the vehicle rear side. The rods 108 are inserted into insertion holes provided in a vehicle upper side end portion of the seatback portion 88. The position of the baseplate 100 in the vehicle front-and-rear direction relative to the seatback portion 88 does not change. Therefore, when the length of the headrest portion 90 in the vehicle front-and-rear direction is increased by the spacing between the baseplates 100 and 102 being increased, a face 90A at the vehicle front side (below referred to as "the front face") of the headrest portion 90 is moved so as to project toward the vehicle front.

The seat control ECU 60 is capable of changing the position of the front face 90A of the headrest portion 90 by starting and stopping driving of the internal motor 106 of the headrest actuator 74, and by controlling the rotation direction and rotation speed of the rotary shaft during the driving. The structure of the headrest actuator 74 shown in FIG. 3 is merely an example. An alternative structure is applicable provided that structure is capable of changing the position of the front face 90A of the headrest portion 90 in the vehicle front-and-rear direction.

The headrest actuator 74 is provided in a predetermined region within the front face 90A of the headrest portion 90. The headrest actuator 74 includes a capacitive sensor that outputs electronic signals in accordance with the magnitude of capacitances between the sensor and an object opposing the predetermined region (usually the head area of a vehicle occupant sitting on the driver seat 70). The capacitive sensor may have, for example, the structure recited in JP-A No. 2007-135846, and may have an alternative structure. The headrest actuator 74 reports a capacitance sensed by the capacitive sensor to the seat control ECU 60. Hence, when the seat control ECU 60 is changing the position of the front face 90A of the headrest portion 90, the seat control ECU 60 may control driving of the internal motor 106 of the headrest actuator 74 in accordance with the capacitance reported from the headrest actuator 74.

Figure 5A:
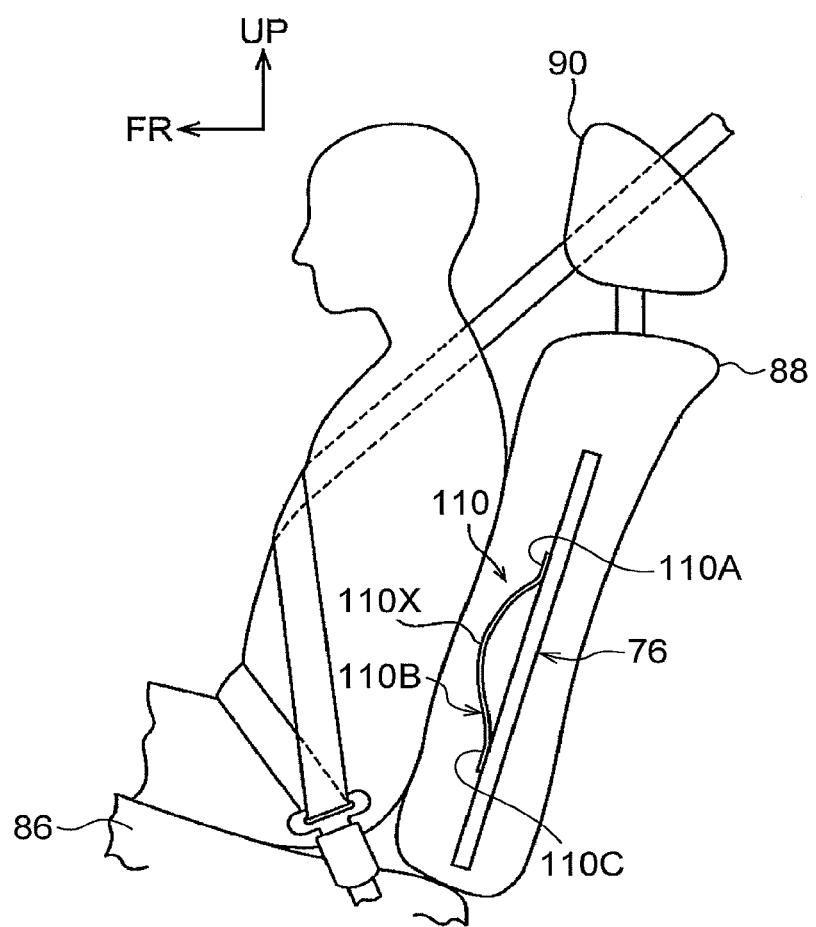
FIG. 5A is a schematic view of an example of a lumbar support actuator, showing a state in which a lumbar support portion is disposed upward.
Figure 5B:
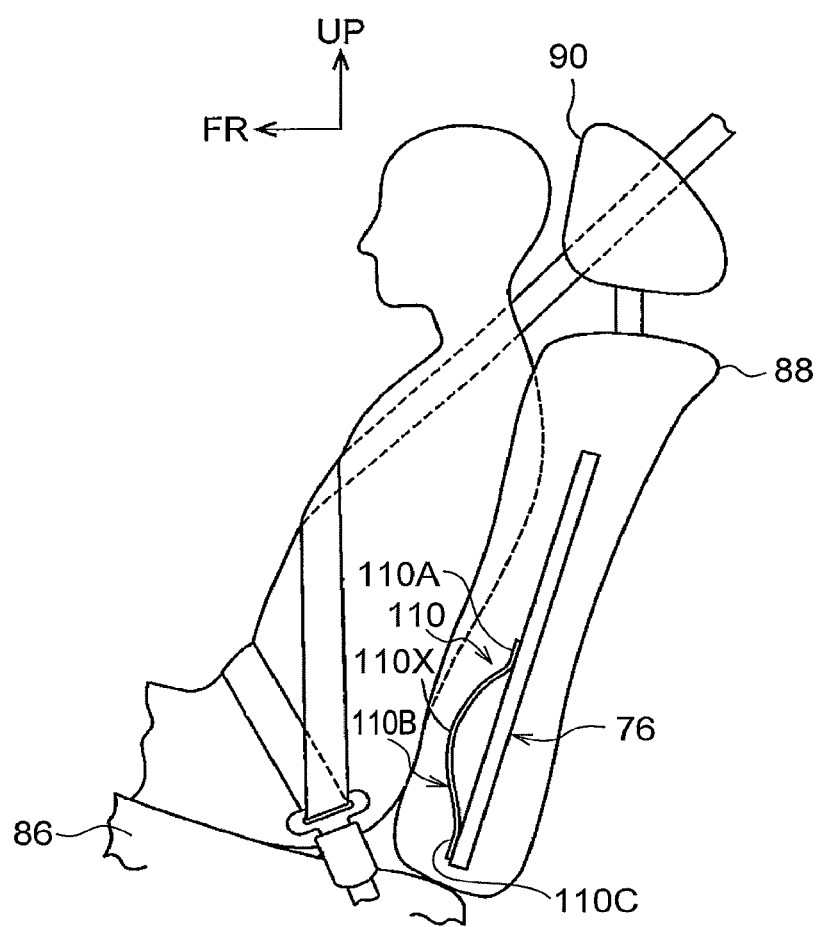
FIG. 5B is a schematic view of the example of the lumbar support actuator, showing a state in which the lumbar support portion is disposed downward.

The lumbar support actuator 76 is incorporated in the seatback portion 88. For example, as shown in FIG. 5A and FIG. 5B, the lumbar support actuator 76 includes a board-shaped lumbar support portion 110 disposed in a range of the seatback portion 88 (the lower portion side of a width direction central portion of the seatback portion 88) that supports the waist area of a seated vehicle occupant. The lumbar support portion 110 extends in the width direction of the seatback portion 88. A curved portion 110B is formed between an upper end portion 110A and a lower end portion 110C of the lumbar support portion 110. The curved portion 110B is curved into a protrusion toward the front side of the seatback portion 88. Accordingly, a protrusion peak portion 110X of the curved portion 110B is a frontmost portion of the lumbar support portion 110 that is disposed furthest to the front side of the seatback portion 88.

As is clear from comparing FIG. 5A with FIG. 5B, the upper end portion 110A and lower end portion 110C of the lumbar support portion 110 are movable in a vertical direction of the seatback portion 88. The lumbar support actuator 76 is equipped with two internal motors. One of the internal motors moves the upper end portion 110A and lower end portion 110C of the lumbar support portion 110 in the vertical direction of the seatback portion 88. The other of the internal motors changes a spacing between the upper end portion 110A and the lower end portion 110C.

When the upper end portion 110A and lower end portion 110C move in the vertical direction of the seatback portion 88, the curved portion 110B of the lumbar support portion 110 also moves in the vertical direction of the seatback portion 88. When the spacing between the upper end portion 110A and the lower end portion 110C changes, a protrusion amount of the protrusion peak portion 110X of the curved portion 110B of the lumbar support portion 110 toward the front side changes. The seat control ECU 60 starts and stops driving of the two internal motors of the lumbar support actuator 76, and controls rotation directions and rotation speeds of rotary shafts of the two internal motors during the driving. Thus, the seat control ECU 60 is capable of changing the position in the vertical direction and the protrusion amount toward the front of the protrusion peak portion 110X of the lumbar support portion 110 of the lumbar support actuator 76.

The lumbar support actuator 76 senses vertical direction positions of the upper end portion 110A and lower end portion 110C of the lumbar support portion 110 of the driver seat 70 and reports the sensed vertical direction positions of the upper end portion 110A and lower end portion 110C of the lumbar support portion 110 to the seat control ECU 60. The sensing of the vertical direction positions of the upper end portion 110A and lower end portion 110C of the lumbar support portion 110 of the driver seat 70 may be implemented by, for example, acquiring signals from sensors that sense rotation amounts of the rotary shafts of the two internal motors. Further, if the internal motors are pulse motors, the sensing may be implemented by counting numbers of pulses in pulse signals supplied to the internal motors.

On the basis of the vertical direction positions of the upper end portion 110A and lower end portion 110C of the lumbar support portion 110 reported by the lumbar support actuator 76, the seat control ECU 60 calculates the vertical direction position and protrusion amount toward the front of the protrusion peak portion 110X of the lumbar support portion 110. The seat control ECU 60 controls driving of the two motors of the lumbar support actuator 76 such that the calculated vertical direction position and protrusion amount toward the front of the protrusion peak portion 110X of the lumbar support portion 110 match target values.

The lumbar support actuator 76 is not limited to the structure illustrated in FIG. 5A and FIG. 5B. For example, as recited in Patent Application No. 2016-017155 by the present applicant, a structure is applicable in which respective air bags are provided in the seatback portion 88 at plural locations with different vertical direction positions, and the position that protrudes furthest toward the vehicle front is switched by selective inflation of the plural air bags. Further, a number of air bags disposed at the lower side of the interior of the seatback portion 88 may be a plural number and when, for example, the driver seat 70 (or front passenger seat 80) is to be put into a rear impact protection attitude or the like, the protrusion amount of the position that protrudes furthest toward the vehicle front may be increased by inflating all of the plural air bags disposed at the lower side.

A pair of lower rails 92, which are seat rails extending in the vehicle front-and-rear direction, are provided at a floor surface of the vehicle. The lower rails 92 are spaced apart in the vehicle width direction and arranged in parallel. Upper rails are attached to a bottom portion of the seat cushion portion 86. The upper rails engage with the lower rails 92 and are slidingly movable along the lower rails 92. Therefore, the seat cushion portion 86, and thus the driver seat 70, is slidable along the lower rails 92 in the vehicle front-and-rear direction (the direction of arrow C and the direction of arrow D in FIG. 2).

The seat sliding actuator 78 is incorporated in the seat cushion portion 86. The seat sliding actuator 78 is structured so as to transmit rotary force of a rotary shaft of an internal motor of the seat sliding actuator 78 to the lower rails 92, via a reduction gear mechanism, to be a driving force that slidingly moves the seat cushion portion 86 in the vehicle front-and-rear direction. Therefore, when the internal motor of of the seat sliding actuator 78 is driven, the driver seat 70 is moved in the direction of arrow C or the direction of arrow D in FIG. 2, depending on a rotation direction of the rotary shaft of the internal motor of the seat sliding actuator 78. Thus, the seat control ECU 60 is capable of changing the vehicle front-and-rear direction position of the driver seat 70 by starting and stopping driving of the internal motor of the seat sliding actuator 78, and by controlling the rotation direction and rotation speed of the rotary shaft during the driving.

The seat sliding actuator 78 senses a vehicle front-and-rear direction position of the driver seat 70, and reports the sensed vehicle front-and-rear direction position of the driver seat 70 to the seat control ECU 60. The sensing of the vehicle front-and-rear direction position of the driver seat 70 may be implemented by, for example, acquiring signals from a sensor that senses the vehicle front-and-rear direction position of the driver seat 70 or rotation amounts of the rotary shaft of the internal motor. Further, if the internal motor of the seat sliding actuator 78 is a pulse motor, the sensing may be implemented by counting numbers of pulses in pulse signals supplied to the internal motor. When the seat control ECU 60 is changing the vehicle front-and-rear direction position of the driver seat 70, the seat control ECU 60 controls the seat sliding actuator 78 such that the reported vehicle front-and-rear direction position of the driver seat 70 matches a target position.

At each of the driver seat 70 and the front passenger seat 80, an operation unit for manually commanding movements of the driver seat 70 or front passenger seat 80 is provided. Each operation unit includes a first control for commanding a change in the angle of the seatback portion 88 of the driver seat 70 or front passenger seat 80 and a second control for commanding a change in the position of the front face 90A of the headrest portion 90 of the driver seat 70 or front passenger seat 80. The operation unit also includes a third control for commanding changes in the vertical direction position and protrusion amount toward the front of the protrusion peak portion 110X of the lumbar support portion 110 of the driver seat 70 or front passenger seat 80 and a fourth control for commanding a change in the vehicle front-and-rear direction position of the driver seat 70 or front passenger seat 80.

In addition to performing the seat control processing described below, the seat control ECU 60 controls the respective actuators 72, 74, 76 and 78 so as to move the driver seat 70 and front passenger seat 80 in accordance with commands when the controls of either of the operation units described above are operated by a vehicle occupant. The seat control ECU 60 is an example of a vehicle occupant protection control unit of the present disclosure and a vehicle occupant protection device relating to the present disclosure. The reclining actuator 72, headrest actuator 74, lumbar support actuator 76 and seat sliding actuator 78 are examples of a seat movement unit of the present disclosure. The seat control ECU 60 may be realized by, for example, a semiconductor integrated circuit, more specifically an application specific integrated circuit (ASIC) or the like.

Figure 6:
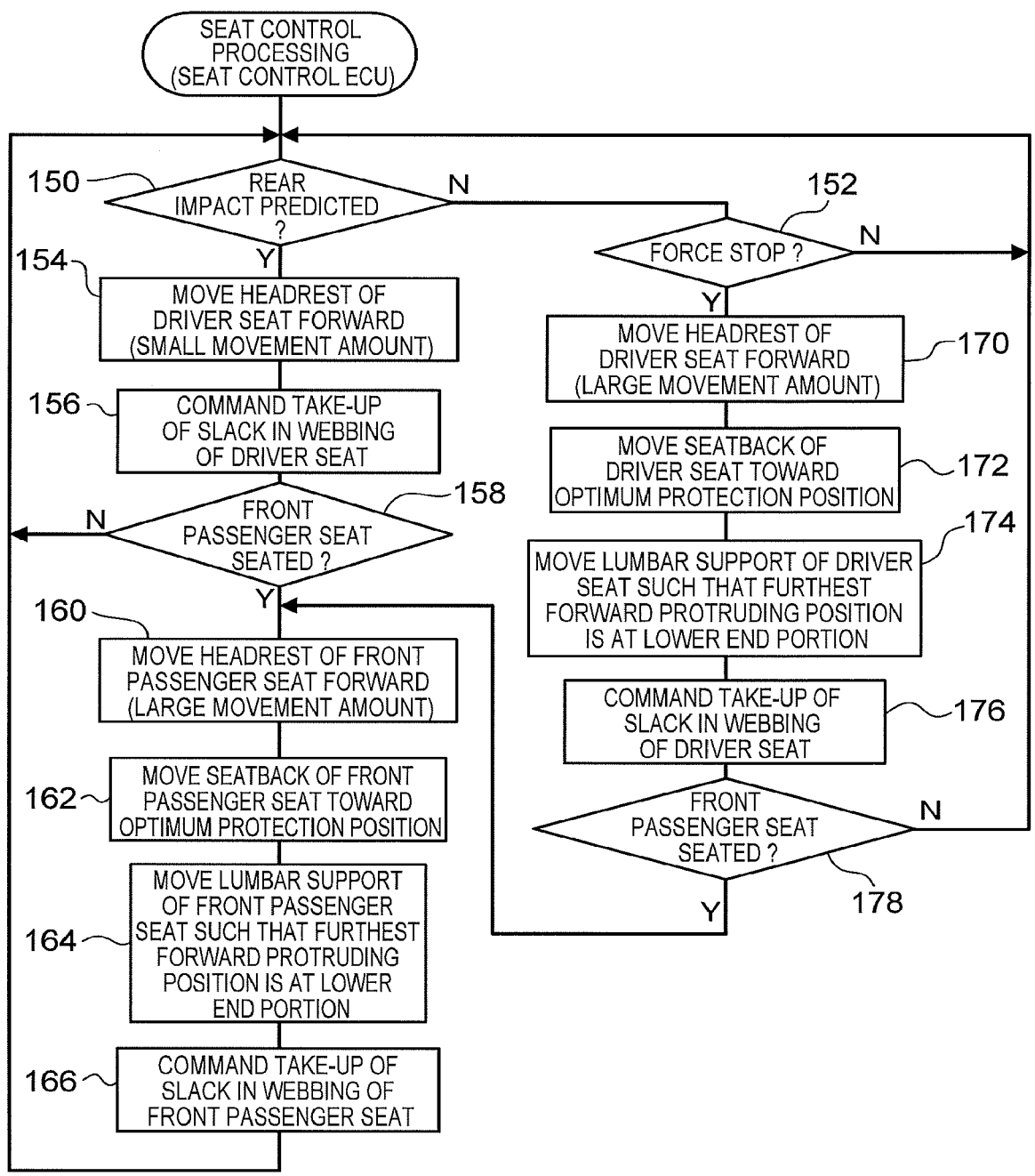
FIG. 6 is a flowchart showing an example of seat control processing.

Now, as operations of the present exemplary embodiment, the seat control processing, which is executed by the seat control ECU 60 while an ignition switch of the present vehicle is switched on, is described with reference to FIG. 6. In step 150 of the seat control processing, the seat control ECU 60 makes a determination as to whether a rear impact of the present vehicle has been predicted by the pre-crash control ECU 34. If no collision prediction signal has been received from the pre-crash control ECU 34, or if a collision prediction signal has been received from the pre-crash control ECU 34 but a collision mode represented by information included in the collision prediction signal is not a rear impact, the result of the determination in step 150 is negative and the seat control ECU 60 proceeds to step 152.

In step 152, the seat control ECU 60 makes a determination as to whether the present vehicle is being force-stopped. If no force stop signal has been received from the force stop determination ECU 58, the result of the determination in step 152 is negative and the seat control ECU 60 returns to step 150. Thus, steps 150 and 152 are repeated until the result of a determination in step 150 or step 152 is affirmative.

When a rear impact is predicted by the pre-crash control ECU 34, a prediction collision signal is received from the pre-crash control ECU 34 and the collision mode represented by the information included in the received prediction collision signal is a rear impact. Therefore, the result of the determination in step 150 is affirmative and the seat control ECU 60 proceeds to step 154. In step 154, the seat control ECU 60 controls the headrest actuator 74 of the driver seat 70 such that the front face 90A of the headrest portion 90 of the driver seat 70 projects toward the vehicle front by a relatively small predetermined amount. Then, in step 156, the seat control ECU 60 commands the webbing take-up ECU 36 to take up slack in the webbing of the driver seat 70. As a result, the webbing take-up ECU 36 controls the webbing take-up actuator 38 such that slack in the webbing of the driver seat 70 is taken up.

Figure 7:
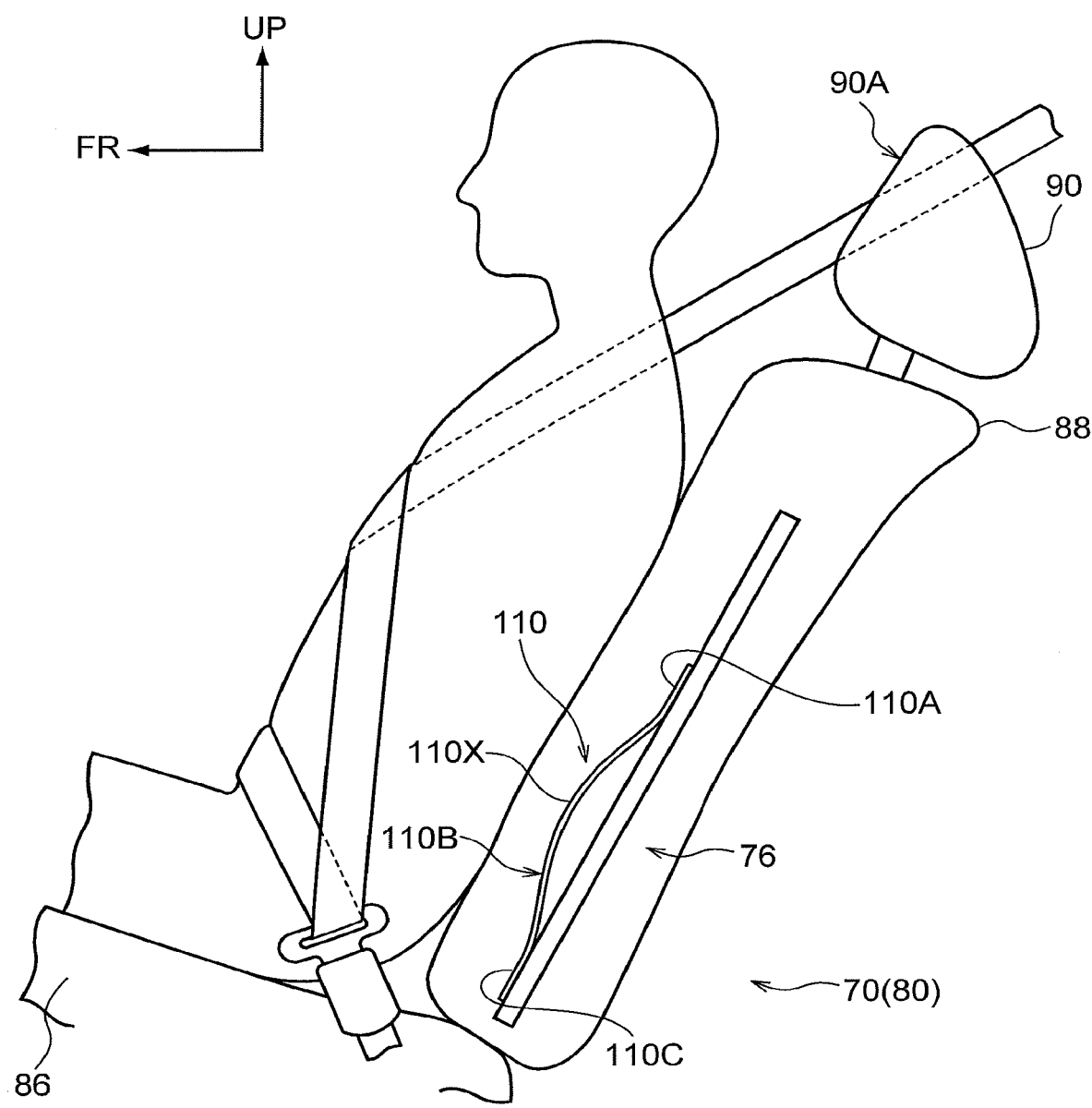
FIG. 7 is a schematic side view showing an example of an attitude of the driver seat (or front passenger seat) when no rear impact is predicted and no force stop is being performed.

As an example, a case in which the driver seat 70 is in the attitude shown in FIG. 7 prior to a rear impact being predicted by the pre-crash control ECU 34 is described. In the attitude of the driver seat 70 shown by the example in FIG. 7, the angle of the seatback portion 88 is tilted relative to a position that protects a vehicle occupant from a rear impact (the position shown in FIG. 9), and the headrest portion 90 is in a state for usual times in which the length of the headrest portion 90 in the vehicle front-and-rear direction is set to a usual length. Further, in the attitude of the driver seat 70 shown in FIG. 7, the lumbar support portion 110 is in a state in which the protrusion amount of the protrusion peak portion 110X toward the vehicle front is small (the protrusion peak portion 110X is not pushing against the vehicle occupant sitting on the driver seat 70).

The driving posture of a vehicle occupant sitting on the driver seat 70 may be any of various postures; the driver seat 70 prior to a rear impact being predicted by the pre-crash control ECU 34 is not limited to the attitude shown in FIG. 7. However, the driver seat 70 prior to a rear impact being predicted by the pre-crash control ECU 34 may be assumed to be in an attitude that is adjusted according to a driving posture determined from the physical build, preferences and the like of the vehicle occupant sitting on the driver seat 70. Even when a rear impact predicted by the pre-crash control ECU 34 has actually occurred, it is necessary for the vehicle occupant sitting on the driver seat 70 to perform driving operations such as, for example, stopping the present vehicle at the roadside and the like.

Accordingly, in the present exemplary embodiment, a change of the attitude of the driver seat 70 when a rear impact is predicted by the pre-crash control ECU 34 is limited to the front face 90A of the headrest portion 90 being projected toward the vehicle front by a relatively small predetermined amount. For example, if the driver seat 70 prior to a rear impact being predicted by the pre-crash control ECU 34 is in the attitude shown in FIG. 7, then when a rear impact is predicted by the pre-crash control ECU 34, the driver seat 70 is changed to the attitude shown in FIG. 8. Thus, hindrance to driving operations being performed by the vehicle occupant sitting on the driver seat 70 is suppressed.

Figure 8:
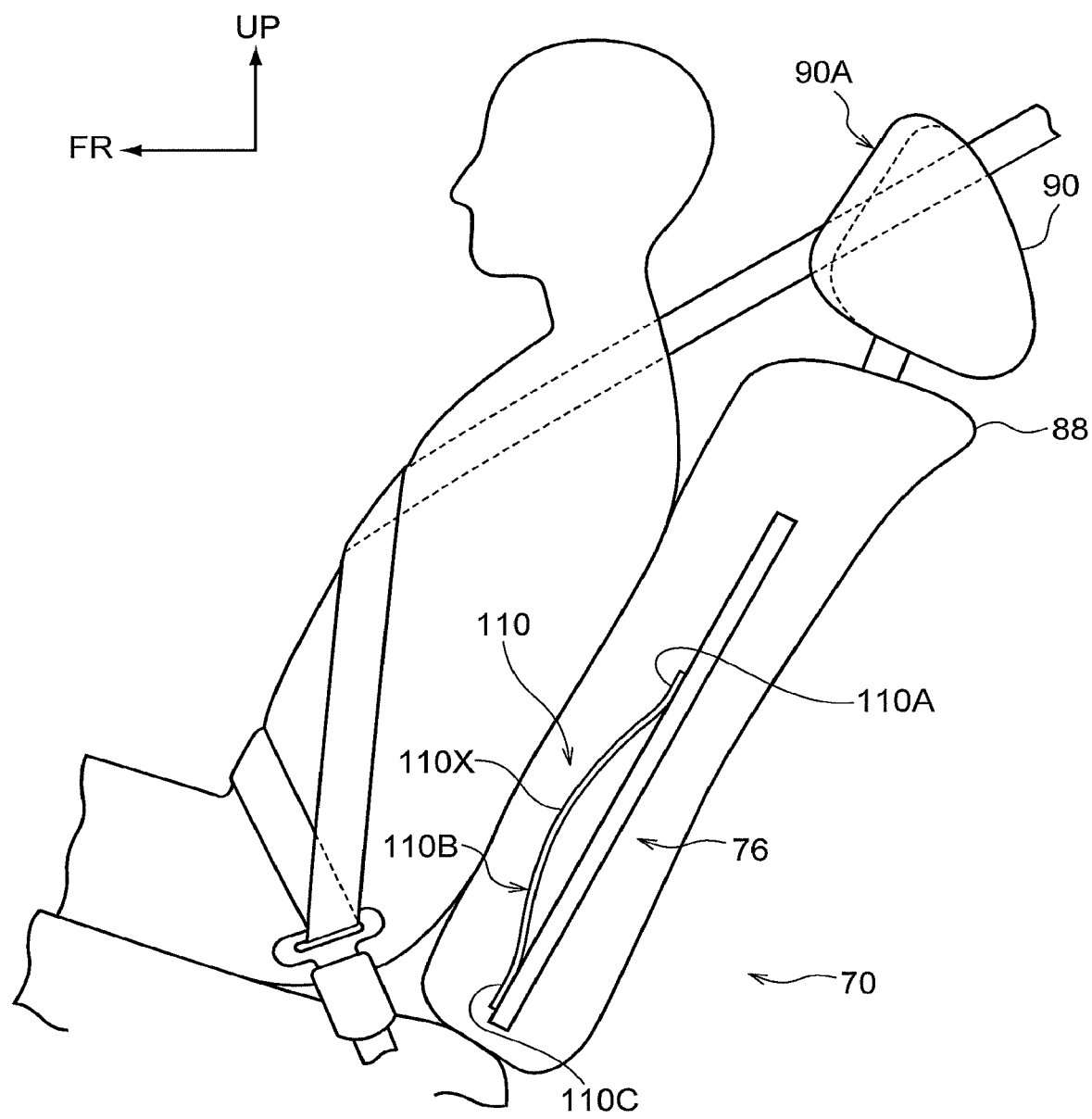
FIG. 8 is a schematic side view showing an example of an attitude of the driver seat (or front passenger seat) when a side impact is predicted in the state shown in FIG. 7.

When the vehicle occupant sitting on the driver seat 70 is performing driving operations, the vehicle occupant holds the steering wheel. Therefore, even if a rear impact predicted by the pre-crash control ECU 34 actually occurs, displacement of the upper body of the vehicle occupant sitting on the driver seat 70 is suppressed to some extent due to the vehicle occupant holding the steering wheel. Accordingly, as illustrated in FIG. 8, injury to the vehicle occupant sitting on the driver seat 70 may be moderated just by the front face 90A of the headrest portion 90 being projected toward the vehicle front by the relatively small predetermined amount.

Next, in step 158, the seat control ECU 60 makes a determination as to whether a vehicle occupant is sitting on the front passenger seat 80 on the basis of detection signals from the sitting sensor unit 82 of the front passenger seat 80. If the result of the determination in step 158 is negative, the seat control ECU 60 returns to step 150, and steps 150 and 152 described above are repeated.

If a vehicle occupant is sitting on the front passenger seat 80, the result of the determination in step 158 is affirmative and the seat control ECU 60 proceeds to step 160. In steps 160 to 164, the seat control ECU 60 controls the actuators 72, 74 and 76 of the front passenger seat 80 so as to put the front passenger seat 80 into a rear impact protection attitude that protects the vehicle occupant sitting on the front passenger seat 80 from the rear impact.

That is, in step 160, the seat control ECU 60 controls the headrest actuator 74 of the front passenger seat 80 such that the front face 90A of the headrest portion 90 of the front passenger seat 80 projects toward the vehicle front by a relatively large projection amount. In this control, for example, close proximity of the head area of the vehicle occupant sitting on the front passenger seat 80 to the front face 90A is determined on the basis of capacitances sensed by the capacitive sensor of the headrest actuator 74 of the front passenger seat 80, and the movement of the headrest portion 90 of the front passenger seat 80 is stopped. To be more specific, the control recited in, for example, JP-A Nos. 2007-131026 and 2007-137219 may be employed. Further, in relation to control after the front face 90A of the headrest portion 90 of the front passenger seat 80 has been temporarily projected toward the vehicle front, the control recited in, for example, JP-A No. 2008-49787 may be employed.

Figure 9:
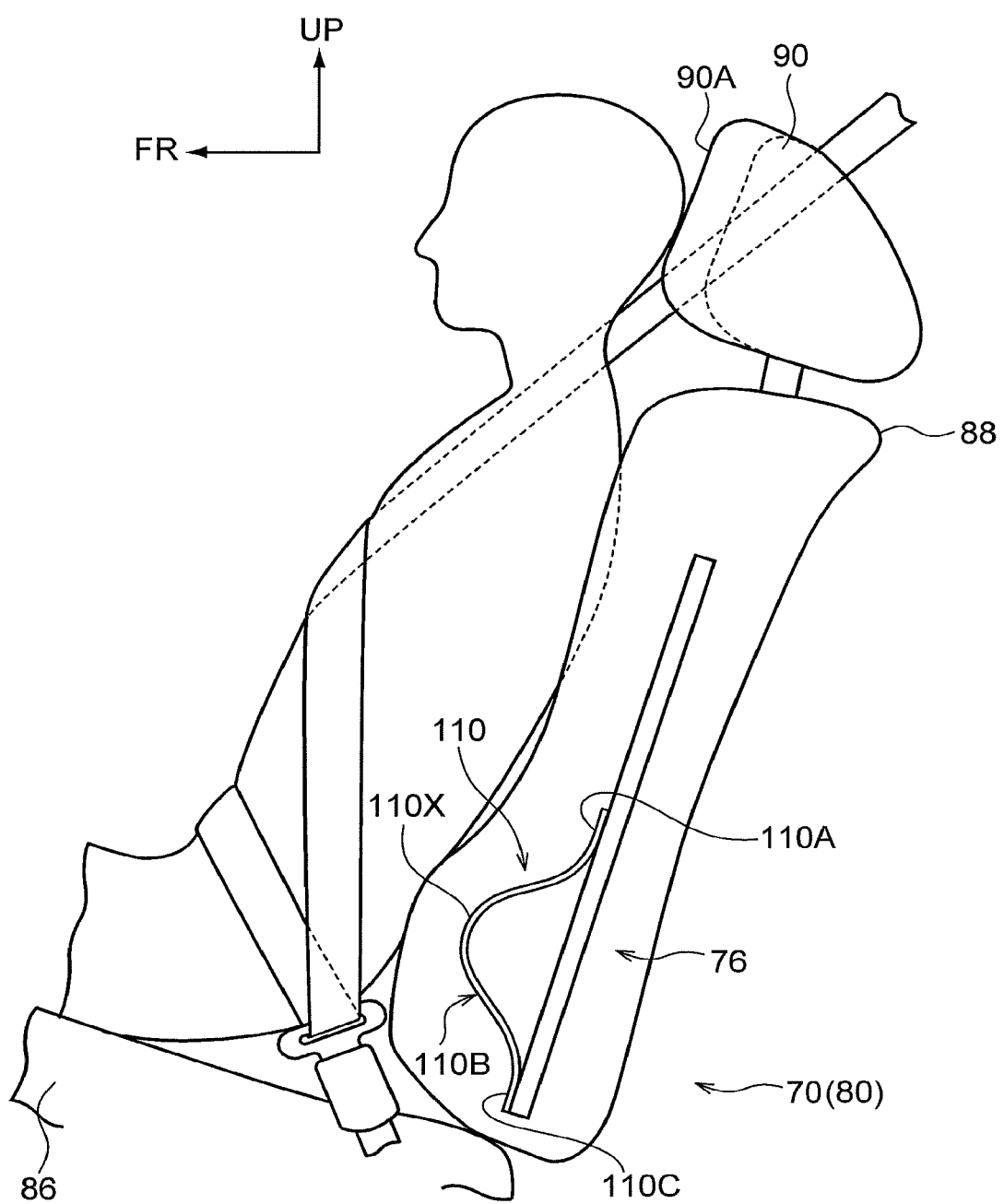
FIG. 9 is a schematic side view showing an example of an attitude of the driver seat when a force stop is being performed from the state shown in FIG. 7, or of an attitude of the front passenger seat when a side impact is predicted or a force stop is being performed from the state shown in FIG. 7.

In step 162, the seat control ECU 60 acquires the current position of the seatback portion 88 of the front passenger seat 80, and makes a determination as to whether the acquired current position matches the position illustrated in FIG. 9, that is, an optimum protection position of the seatback portion 88 for protecting the vehicle occupant from a rear impact. Then, if the current position of the seatback portion 88 of the front passenger seat 80 differs from the optimum protection position, the seat control ECU 60 controls the reclining actuator 72 of the front passenger seat 80 so as to move the seatback portion 88 of the front passenger seat 80 toward the optimum protection position illustrated in FIG. 9. Thereafter, if the rear impact predicted by the pre-crash control ECU 34 is avoided, then, for example, the technology recited in JP-A No. 2009-166596 may be employed and the seatback portion 88 of the front passenger seat 80 moved such that the vehicle occupant moves away from the seatbelt.

In step 164, the seat control ECU 60 acquires the current vertical direction position and protrusion amount toward the vehicle front of the protrusion peak portion 110X of the lumbar support portion 110 of the front passenger seat 80, and makes a determination as to whether the acquired vertical direction position is at the lowermost position and the protrusion amount is at a maximum. If the result of this determination is negative, the seat control ECU 60 controls the lumbar support actuator 76 of the front passenger seat 80 such that the vertical direction position of the protrusion peak portion 110X of the lumbar support portion 110 of the front passenger seat 80 is at the lowermost position and the protrusion amount toward the vehicle front is at the maximum.

Then, in step 166, the seat control ECU 60 commands the webbing take-up ECU 36 to take up slack in the webbing of the front passenger seat 80. As a result, the webbing take-up ECU 36 controls the webbing take-up actuator 38 such that slack in the webbing of the front passenger seat 80 is taken up. For example, the technology recited in JP-A No. 2009-292417 may be applied to the take-up of the webbing of the front passenger seat 80, performing control such that a driving force produced by the webbing take-up actuator 38 is small. When step 166 has been executed, the seat control ECU 60 returns to step 150.

If, for example, the front passenger seat 80 is in the attitude illustrated in FIG. 7 prior to a rear impact being predicted by the pre-crash control ECU 34, then when a rear impact is predicted by the pre-crash control ECU 34, the front passenger seat 80 is changed to, for example, the attitude illustrated in FIG. 9 by steps 160 to 164 described above.

In the attitude shown in FIG. 9, the vertical direction position of the protrusion peak portion 110X of the lumbar support portion 110 of the front passenger seat 80 is at the lowermost position and the protrusion amount toward the vehicle front is at the maximum. Thus, the waist area of the vehicle occupant sitting on the front passenger seat 80 is pushed toward the vehicle front and the upper body tends to tilt rearward. In the attitude shown in FIG. 9, the seatback portion 88 of the front passenger seat 80 is disposed at the optimum protection position and the back area of the vehicle occupant sitting on the front passenger seat 80 is in area contact with the seatback portion 88. Moreover, in the attitude shown in FIG. 9, the headrest portion 90 of the front passenger seat 80 has been moved such that a spacing between the head area of the vehicle occupant sitting on the front passenger seat 80 and the front face 90A is at a minimum. Therefore, the rear of the head area of the vehicle occupant sitting on the front passenger seat 80 is in area contact with the headrest portion 90 of the front passenger seat 80.

Thus, if the rear impact predicted by the pre-crash control ECU 34 actually occurs, the head area of the vehicle occupant sitting on the front passenger seat 80 is promptly braced by the headrest portion 90, and the back area of the vehicle occupant is promptly braced by the seatback portion 88. Therefore, injury to the vehicle occupant sitting on the front passenger seat 80 when the rear impact occurs can be moderated.

Now, a case is described in which the force stop determination ECU 58 determines that conditions for force-stopping the present vehicle are satisfied and the seat control ECU 60 receives a force stop signal from the force stop determination ECU 58. When the force stop signal is received from the force stop determination ECU 58, the result of the determination in step 152 is affirmative and the seat control ECU 60 proceeds to step 170. A force stop of the present vehicle is implemented by the autonomous driving control ECU 44; driving operations are not expected to be performed by the vehicle occupant sitting on the driver seat 70. Therefore, in steps 170 to 174, the seat control ECU 60 controls the actuators 72, 74 and 76 of the driver seat 70 so as to put the driver seat 70 into the rear impact protection attitude that protects the vehicle occupant sitting on the driver seat 70 from a rear impact.

That is, in step 170, the seat control ECU 60 controls the headrest actuator 74 of the driver seat 70 such that the front face 90A of the headrest portion 90 of the driver seat 70 projects toward the vehicle front by a relatively large projection amount. In this control, for example, close proximity of the head area of the vehicle occupant sitting on the driver seat 70 to the front face 90A is determined on the basis of capacitances sensed by the capacitive sensor of the headrest actuator 74 of the driver seat 70, and the movement of the headrest portion 90 of the driver seat 70 is stopped. To be more specific, the control recited in, for example, JP-A Nos. 2007-131026 and 2007-137219 may be employed. Further, in relation to control after the front face 90A of the headrest portion 90 of the driver seat 70 has been temporarily projected toward the vehicle front, the control recited in, for example, JP-A No. 2008-49787 may be employed.

In step 172, the seat control ECU 60 acquires the current position of the seatback portion 88 of the driver seat 70, and makes a determination as to whether the acquired current position matches the position illustrated in FIG. 9, that is, the optimum protection position of the seatback portion 88 for protecting the vehicle occupant from a rear impact. Then, if the current position of the seatback portion 88 of the driver seat 70 differs from the optimum protection position, the seat control ECU 60 controls the reclining actuator 72 of the driver seat 70 so as to move the seatback portion 88 of the driver seat 70 toward the optimum protection position illustrated in FIG. 9.

In step 174, the seat control ECU 60 acquires the current vertical direction position and protrusion amount toward the vehicle front of the protrusion peak portion 110X of the lumbar support portion 110 of the driver seat 70, and makes a determination as to whether the acquired vertical direction position is at the lowermost position and the protrusion amount is at the maximum. If the result of this determination is negative, the seat control ECU 60 controls the lumbar support actuator 76 of the driver seat 70 such that the vertical direction position of the protrusion peak portion 110X of the lumbar support portion 110 of the driver seat 70 is at the lowermost position and the protrusion amount toward the vehicle front is at the maximum.

Then, in step 176, the seat control ECU 60 commands the webbing take-up ECU 36 to take up slack in the webbing of the driver seat 70. As a result, the webbing take-up ECU 36 controls the webbing take-up actuator 38 such that slack in the webbing of the driver seat 70 is taken up. For example, the technology recited in JP-A No. 2009-292417 may be applied to the take-up of the webbing of the driver seat 70, performing control such that a driving force produced by the webbing take-up actuator 38 is small.

If, for example, the driver seat 70 is in the attitude illustrated in FIG. 7 prior to a force stop signal being received, then when a force stop signal is received from the force stop determination ECU 58, the driver seat 70 is changed to, for example, the attitude illustrated in FIG. 9 by steps 170 to 174 described above.

In the attitude shown in FIG. 9, the vertical direction position of the protrusion peak portion 110X of the lumbar support portion 110 of the driver seat 70 is at the lowermost position and the protrusion amount toward the vehicle front is at the maximum. Thus, the waist area of the vehicle occupant sitting on the driver seat 70 is pushed toward the vehicle front and the upper body tends to tilt rearward. In the attitude shown in FIG. 9, the seatback portion 88 of the driver seat 70 is disposed at the optimum protection position and the back area of the vehicle occupant sitting on the driver seat 70 is in area contact with the seatback portion 88. Moreover, in the attitude shown in FIG. 9, the headrest portion 90 of the driver seat 70 has been moved such that a spacing between the head area of the vehicle occupant sitting on the driver seat 70 and the front face 90A is at a minimum. Therefore, the rear of the head area of the vehicle occupant sitting on the driver seat 70 is in area contact with the headrest portion 90 of the driver seat 70.

Thus, if a rear impact occurs during the execution or after the completion of force stop processing by the autonomous driving control ECU 44, the head area of the vehicle occupant sitting on the driver seat 70 is promptly braced by the headrest portion 90, and the back area of the vehicle occupant is promptly braced by the seatback portion 88. Therefore, injury to the vehicle occupant sitting on the driver seat 70 when the rear impact occurs can be moderated. Moreover, because the vehicle occupant sitting on the driver seat 70 is not expected to perform driving operations while the force stop of the present vehicle is being implemented by the autonomous driving control ECU 44, putting the driver seat 70 into the rear impact protection attitude is no hindrance to driving operations.

Then, in step 178, the seat control ECU 60 makes a determination as to whether a vehicle occupant is sitting on the front passenger seat 80 on the basis of detection signals from the sitting sensor unit 82 of the front passenger seat 80. If the result of the determination in step 178 is negative, the seat control ECU 60 returns to step 150. If a vehicle occupant is sitting on the front passenger seat 80, the result of the determination in step 178 is affirmative and the seat control ECU 60 proceeds to step 160. Then, through steps 160 to 166 described above, the seat control ECU 60 controls the actuators 72, 74 and 76 of the front passenger seat 80 so as to put the front passenger seat 80 into the rear impact protection attitude that protects the vehicle occupant sitting on the front passenger seat 80 from a rear impact, and slack in the webbing of the front passenger seat 80 is taken up.

In the above descriptions, a mode is described in which the front face 90A of the headrest portion 90 of the driver seat 70 is projected toward the vehicle front by a relatively small predetermined amount when a collision is predicted by the pre-crash control ECU 34. However, the present disclosure is not limited thus. For example, the attitude of the driver seat 70 need not be changed (moved) when a rear impact is predicted. This may be realized by omitting the processing of step 154 from the seat control processing shown in FIG. 6. In this mode, because the driver seat 70 is not moved when a rear impact is predicted, hindrance to driving operations that are performed by the vehicle occupant sitting on the driver seat 70 may be assuredly avoided.

When a rear impact is predicted, one or more of a movement toward the vehicle front of the headrest portion 90, a movement of the seatback portion 88, and a change of protrusion position and protrusion amount of the lumbar support portion 110 may be applied to the driver seat 70. In this mode, because the driver seat 70 approaches the rear impact protection attitude when a rear impact is predicted, protection performance for a vehicle occupant sitting on the driver seat 70 if the predicted rear impact actually occurs is improved. However, because the vehicle occupant sitting on the driver seat 70 performs driving operations when the rear impact has occurred, it is desirable for changes in the attitude of the driver seat 70 to stop within a range that does not hinder driving operations (keeping movement amounts small).

In the above descriptions, as an example of movement of the headrest portion 90 of the driver seat 70 or front passenger seat 80, a movement of the headrest portion 90 toward the vehicle front is described. However, the present disclosure is not limited thus; the headrest portion 90 may be moved in the vehicle vertical direction. It is desirable if the position of the headrest portion 90 in the vehicle vertical direction is a position that braces the head area of the vehicle occupant at least at the height of the vicinity of the ears. Therefore, at least when the vehicle is being force-stopped, if the position of the headrest portion 90 in the vehicle vertical direction is offset from the desirable position, the headrest portion 90 may be moved in the vehicle vertical direction. The headrest portion 90 may be moved in the vehicle vertical direction instead of the headrest portion 90 being moved toward the vehicle front, or the headrest portion 90 may be both moved in the vehicle vertical direction and moved toward the vehicle front.

In the above descriptions, as an example of the driver seat 70 approaching the rear impact protection attitude when the vehicle is being force-stopped, a mode is described in which the headrest portion 90 is moved toward the vehicle front, the seatback portion 88 is moved, and the protrusion position and protrusion amount of the lumbar support portion 110 are changed. However, the present disclosure is not limited thus. When the vehicle is being force-stopped, the driver seat 70 may be moved toward the vehicle front by the seat sliding actuator 78. Further, in the above descriptions a mode is described in which the driver seat 70 is matched to the rear impact protection attitude when the vehicle is being force-stopped, but this is not limiting. The driver seat 70 may approach the rear impact protection attitude prior to the vehicle being force-stopped.

A vehicle occupant protection effect due to the driver seat 70 (and front passenger seat 80) being moved toward the vehicle front is mainly caused by the driver seat 70 (and front passenger seat 80) being physically moved away from a rear face of the vehicle that receives the energy of a rear impact. Therefore, control that moves the driver seat 70 (and front passenger seat 80) toward the vehicle front is particularly effective in a vehicle in which a distance between the rear face of the vehicle and the driver seat 70 (and front passenger seat 80) is small (for example, a two-occupant vehicle in which there are no rear seats). Thus, this control may be performed when the distance between the rear face of the vehicle and the driver seat 70 (and front passenger seat 80) is less than a predetermined value.

As control applied to a seat other than a driver seat of a vehicle, the control applied to the front passenger seat 80 is described in the above descriptions, but this is not limiting. The control applied to the front passenger seat 80 that is described above may be applied to seats other than a driver seat and front passenger seat of a vehicle.

A first aspect is a vehicle occupant protection device, that includes: a vehicle occupant protection control unit that, in a case in which a rear impact of the vehicle is predicted, effects control such that a seat of the vehicle approaches a rear impact protection attitude that protects a vehicle occupant from a rear impact, and that, in a case in which the vehicle is forcibly stopped, effects control such that a driver seat of the vehicle approaches closer to the rear impact protection attitude than in the case in which a rear impact of the vehicle is predicted.

In the first aspect, when a rear impact of the vehicle is predicted by the rear impact prediction unit, the vehicle occupant protection control unit controls the seat movement unit so as to bring the seat of the vehicle closer to the rear impact protection attitude for protecting the vehicle occupant from the rear impact. Therefore, when a rear impact is predicted by the rear impact prediction unit and the predicted rear impact actually occurs, protection performance is improved for the vehicle occupant sitting on the seat that has been moved so as to approach the rear impact protection attitude.

If the vehicle is being force-stopped by the forcible stop control unit, the vehicle occupant protection control unit controls the seat movement unit such that the driver seat of the vehicle is brought even closer to the rear impact protection attitude than in the case in which a rear impact of the vehicle is predicted by the rear impact prediction unit. Therefore, when a rear impact of the vehicle is predicted, movement of the driver seat is restrained compared to the case in which the vehicle is being force-stopped. Therefore, hindrance to driving operations being performed by the vehicle occupant sitting on the driver seat when a rear impact is predicted by the rear impact prediction unit and the predicted rear impact actually occurs is suppressed.

In contrast, when the vehicle is being force-stopped by the forcible stop control unit, driving operations by a vehicle occupant sitting on the driver seat are not expected. In this case, in the first aspect control is performed such that the driver seat of the vehicle is brought closer to the rear impact protection attitude than in the case in which a rear impact of the vehicle is predicted. Therefore, if a rear impact occurs when the vehicle is being force-stopped, protection performance for the vehicle occupant sitting on the driver seat is improved. Thus, according to the first aspect, safety of a vehicle occupant when a rear impact occurs may be improved, while hindrance to driving operations being performed by a vehicle occupant sitting on a driver seat may be suppressed.

A second aspect is the vehicle occupant protection device of the first aspect. In a case in which a rear impact of the vehicle is predicted, the vehicle occupant protection control unit effects control such that at least one seat of the vehicle other than the driver seat approaches the rear impact protection attitude, and in a case in which the vehicle is forcibly stopped, the vehicle occupant protection control unit effects control such that a plurality of the seats of the vehicle respectively approach the rear impact protection attitude, the plurality of the seats including the driver seat.

In the second aspect, when a rear impact of the vehicle is predicted, the vehicle occupant protection control unit performs control so as to bring at least one seat of the vehicle other than the driver seat closer to the rear impact protection attitude. Therefore, because the driver seat is not moved when a rear impact of the vehicle is predicted, hindrance to driving operations being performed by a vehicle occupant sitting on the driver seat is avoided. When the vehicle is being force-stopped, the vehicle occupant protection control unit performs control so as to bring each of plural seats including the driver seat of the vehicle closer to the rear impact protection attitude. Therefore, if a rear impact occurs when the vehicle is being force-stopped, the safety of respective vehicle occupants sitting on the plural seats including the driver seat may be improved.

A third aspect is the vehicle occupant protection device of the first aspect. In a case in which a rear impact of the vehicle is predicted, the vehicle occupant protection control unit controls the driver seat such that the driver seat assumes a first attitude that approaches the rear impact protection attitude, and in a case in which the vehicle is forcibly stopped, the vehicle occupant protection control unit controls the driver seat of the vehicle such that the driver seat assumes a second attitude that approaches closer to the rear impact protection attitude than the first attitude.

In the third aspect, when a rear impact of the vehicle is predicted, the vehicle occupant protection control unit controls the driver seat of the vehicle into the first attitude that is brought closer to the rear impact protection attitude. The second attitude, into which the driver seat is controlled when the vehicle is being force-stopped, is even closer to the rear occupant protection attitude than the first attitude. Therefore, when a rear impact of the vehicle is predicted, hindrance to driving operations being performed by a vehicle occupant sitting on the driver seat may be suppressed. Moreover, because the driver seat of the vehicle is controlled to the second attitude that is closer to the rear impact protection attitude than the first attitude when the vehicle is being force-stopped, if a rear impact occurs when the vehicle is being force-stopped, the safety of the vehicle occupant sitting on the driver seat may be improved.

A fourth aspect is a vehicle occupant protection device, that includes: a rear impact prediction unit that predicts a rear impact of a vehicle; a forcible stop control unit that forcibly stops the vehicle in a case in which a condition for forcibly stopping the vehicle is satisfied; a seat movement unit that moves a seat of the vehicle; and a vehicle occupant protection control unit that: in a case in which a rear impact of the vehicle is predicted by the rear impact prediction unit, controls the seat movement unit such that the seat of the vehicle approaches a rear impact protection attitude that protects a vehicle occupant from a rear impact, and in a case in which the vehicle is forcibly stopped by the forcible stop control unit, controls the seat movement unit such that a driver seat of the vehicle approaches closer to the rear impact protection attitude than in the case in which a rear impact of the vehicle is predicted by the rear impact prediction unit.

In the fourth aspect, when a rear impact of the vehicle is predicted, the vehicle occupant protection control unit performs control so as to bring the seat of the vehicle closer to the rear impact protection attitude for protecting the vehicle occupant from the rear impact. When the vehicle is being force-stopped, the vehicle occupant protection control unit performs control so as to bring the driver seat of the vehicle even closer to the rear impact protection attitude than in the case in which a rear impact of the vehicle is predicted. Therefore, according to the fourth aspect, similarly to the first aspect, safety of a vehicle occupant when a rear impact occurs may be improved while hindrance to driving operations by a vehicle occupant sitting on a driver seat may be suppressed.

The present disclosure improves safety of a vehicle occupant when a rear impact occurs, while suppressing hindrance to driving operations being performed by a vehicle occupant sitting on a driver seat.

What is claimed is:
1. A vehicle occupant protection device, comprising:
   at least one electronic control unit configured to:
   in a case in which a rear impact of a vehicle is predicted, sequentially perform:
      first, move a headrest of a driver seat toward a vehicle front by a first amount;
      second, in a case in which an occupant is sitting on a passenger seat of the vehicle, sequentially perform:
         first, move a headrest of the passenger seat toward the vehicle front by a second amount that is larger than the first amount, and
         second, move a seatback portion of the passenger seat toward a protective position where the occupant sitting on the passenger seat is protected from the rear impact of the vehicle or move a lumbar support of the passenger seat such that a protrusion position toward the vehicle front becomes a lowermost position, and in a case in which the vehicle is forcibly stopped, sequentially perform:
first, move the headrest of the driver seat toward the vehicle front by a third amount that is larger than the first amount; and
second, move a seatback portion of the driver seat toward a protective position where an occupant sitting in the driver seat is protected from the rear impact of the vehicle or move a lumbar support of the driver seat such that a protrusion position toward the vehicle front becomes a lowermost position.

2. The vehicle occupant protection device of claim 1, wherein the at least one electronic control unit is configured to:
in a case in which the vehicle is forcibly stopped and the occupant is sitting on the passenger seat of the vehicle:
after moving the headrest of the driver seat and moving the seatback portion of the driver seat or moving the lumbar support of the driver seat:
first, move the headrest of the passenger seat toward the vehicle front by a fourth amount that is larger than the first amount, and
second, move the seatback portion of the passenger seat toward the protective position or move the lumbar support of the passenger seat such that the protrusion position toward the vehicle front becomes the lowermost position.

3. The vehicle occupant protection device of claim 2, wherein the at least one electronic control unit is configured to:
in the case in which the rear impact of the vehicle is predicted or in the case in which the vehicle is forcibly stopped:
after moving the headrest of the driver seat, take up slack in a webbing of the driver seat; and
in the case in which the rear impact of the vehicle is predicted or in the case in which the vehicle is forcibly stopped and the occupant is sitting on the passenger seat:
after moving the headrest of the passenger seat, take up slack of a webbing of the passenger seat.

4. A non-transitory storage medium storing a program executable by a computer to perform vehicle occupant protection processing of a vehicle, the processing comprising:
in a case in which a rear impact of the vehicle is predicted, sequentially performing:
first, moving a headrest of a driver seat toward a vehicle front by a first amount; and
second, in a case in which an occupant is sitting on a passenger seat of the vehicle, sequentially performing:
first, moving a headrest of the passenger seat toward the vehicle front by a second amount that is larger than the first amount, and
second, moving a seatback portion of the passenger seat toward a protective position where the occupant sitting in the passenger seat is protected from the rear impact of the vehicle or moving a lumbar support of the passenger seat such that a protrusion position toward the vehicle front becomes a lowermost position, and
in a case in which control is performed so as to forcibly stop the vehicle, sequentially performing:
first, moving the headrest of the driver seat toward the vehicle front by a third amount that is larger than the first amount; and
second, moving a seatback portion of the driver seat toward a protective position where an occupant sitting in the driver seat is protected from the rear impact of the vehicle or moving a lumbar support of the driver seat such that a protrusion position toward the vehicle front becomes a lowermost position.

5. The non-transitory storage medium of claim 4, wherein the processing further comprises:
in a case in which the vehicle is forcibly stopped and the occupant is sitting on the passenger seat of the vehicle:
after moving the headrest of the driver seat and moving the seatback portion of the driver seat or moving the lumbar support of the driver seat:
first, moving the headrest of the passenger seat toward the vehicle front by a fourth amount that is larger than the first amount, and
second, moving the seatback portion of the passenger seat toward the protective position or moving the lumbar support of the passenger seat such that the protrusion position toward the vehicle front becomes the lowermost position.

6. The non-transitory storage medium of claim 5, wherein the processing further comprises:
in the case in which the rear impact of the vehicle is predicted or in the case in which the vehicle is forcibly stopped:
after moving the headrest of the driver seat, taking up slack in a webbing of the driver seat; and
in the case in which the rear impact of the vehicle is predicted or in the case in which the vehicle is forcibly stopped and the occupant is sitting on the passenger seat:
after moving the headrest of the passenger seat, taking up slack of a webbing of the passenger seat.

7. A method comprising:
in a case in which a rear impact of a vehicle is predicted, sequentially performing:
first, moving a headrest of a driver seat toward a vehicle front by a first amount; and
second, in a case in which an occupant is sitting on a passenger seat of the vehicle, sequentially performing:
first, moving a headrest of the passenger seat toward the vehicle front by a second amount that is larger than the first amount, and
second, moving a seatback portion of the passenger seat toward a protective position where the occupant sitting in the passenger seat is protected from the rear impact of the vehicle or moving a lumbar support of the passenger seat such that a protrusion position toward the vehicle front becomes a lowermost position, and
in a case in which control is performed so as to forcibly stop the vehicle, sequentially performing:
first, moving the headrest of the driver seat toward the vehicle front by a third amount that is larger than the first amount; and
second, moving a seatback portion of the driver seat toward a protective position where an occupant sitting in the driver seat is protected from the rear impact of the vehicle or moving a lumbar support of the driver seat such that a protrusion position toward the vehicle front becomes a lowermost position.

8. The method of claim 7, further comprising:
in a case in which the vehicle is forcibly stopped and the occupant is sitting on the passenger seat of the vehicle:
  after moving the headrest of the driver seat and moving the seatback portion of the driver seat or moving the lumbar support of the driver seat:
    first, moving the headrest of the passenger seat toward the vehicle front by a fourth amount that is larger than the first amount, and
    second, moving the seatback portion of the passenger seat toward the protective position or moving the lumbar support of the passenger seat such that the protrusion position toward the vehicle front becomes the lowermost position.

9. The method of claim 8, further comprising:
in the case in which the rear impact of the vehicle is predicted or in the case in which the vehicle is forcibly stopped:
  after moving the headrest of the driver seat, taking up slack in a webbing of the driver seat; and
in the case in which the rear impact of the vehicle is predicted or in the case in which the vehicle is forcibly stopped and the occupant is sitting on the passenger seat:
after moving the headrest of the passenger seat, taking up slack of a webbing of the passenger seat.

* * * * *